April 29, 1969     A. B. MERGET     3,440,788
BUILDING BLOCKS WITH A SHELL CONTAINING A FILLER AND HAVING
PROJECTIONS AND DEPRESSIONS CONNECTED BY TUBES
Filed June 11, 1965     Sheet 4 of 5

United States Patent Office 3,440,788
Patented Apr. 29, 1969

3,440,788
BUILDING BLOCKS WITH A SHELL CONTAINING A FILLER AND HAVING PROJECTIONS AND DEPRESSIONS CONNECTED BY TUBES
Arthur B. Merget, 247 Westland Drive, Greensburg, Pa. 15601
Filed June 11, 1965, Ser. No. 463,167
Int. Cl. E04c 1/40
U.S. Cl. 52—405                                16 Claims

ABSTRACT OF THE DISCLOSURE

The disclosure relates to a building block with a core of rigid material and a plastic shell. The block is provided with apertured projections and depressions on opposed surfaces thereof with tubes extending between said apertures and supporting the projectons and depressions. The block shell can be prefabricated and filled with core material and the core may be prefabricated and the shell provided as a coating.

This invention relates to a new and improved building bolck and methods of constructing and using the same; more particularly, the invention relates to a block of solid material, in some embodiments completely enclosed in a shell of other material, such as plastic, and of the type which has interfitting projections and depressions, with tubes extending through the blocks in some embodiments for tie rods or loose pins.

Prior art building blocks, although receiving much attention from inventors for many years, still are characterized by limitations and disadvantages. One of the foremost of these is that widely used blocks of conventional construction are not easily used by laymen, but rather require skills which are usually acquired by mens in the masonry field.

Another disadvantage of most prior art blocks is the necessity of using a bonding agent such as mortar to hold the blocks together in an assembled position.

Furthermore, most prior art blocks by themselves have no aesthetic appeal; when used for exterior walls, the surface exposed to the eye is usually painted or stuccoed; when used for interior walls, the interior surface is painted or plastered.

My block and methods of constructing and using the same overcome these and many other disadvantages of the prior art.

In summary, the block of my invention in some embodiments includes an outer shell of a suitable plastic material, and a rigid, durable interior which gives strength and permanence to the structure. In one method of constructing my block, a shell of plastic material, containing projections on one surface designed to interfit with similarly shaped depressions on the surface of an adjacent block, and containing two tubes, each passing through the block normal to the surface of one depression and the oppositely disposed projection, is first completed either by molding in one part, in two attachable parts, in four attachable parts, or in eight attachable parts. According to some methods of constructing the block, an additional attachable plug is required to close a charging hole in the body of the block. When the block is made in two or more attachable parts, it is then assembled and bonded, and is then filled with material to give mechanical strength. In devising my improved block I was particularly concerned with making a block which could use as a filler material the large amounts of coal mine waste, such as overburden, remaining in coal mining areas of the beautiful Commonwealth of Pennsylvania; overburden may be used with a suitable bonding agent as the reinforcing body or filler of my block.

In another embodiment of the block, I cast, mold or otherwise form the solid body portion first, with two metal or plastic tubes passing therethrough to serve as the aforementioned tubes for reinforcing rods, the body portion having depressions on one surface and interfitting projections on the opposite surface, and after drying and hardening I create a shell of plastic material on the body, by dipping or other method.

The art of constructing a wall using my block is simple and inexpensive; if a retaining wall is to be built, I utilize a "book end" principle to avoid the necessity for expensive anchoring of the lower extremity of the wall.

Accordingly, a primary object of my invention is to provide a new and improved building block offering advantages over any block now known in the art.

Another object is to provide a new and improved building block having an outer shell of plastic material and a body of hard material to give strength and rigidity.

An ancillary object is to provide a new and improved building block having a shell of plastic material, the shell of which may be cast or molded in several easily made parts, which may be shipped in a minimum of shipping space, the parts being thereafter assembled at their destination and bonded to form a complete shell.

A further object is to provide a new and improved building block having a rigid body dipped in a plastic material to form a relatively smooth and attractive exterior surface.

Still another object is to provide a new and improved method of constructing a building block.

Another object is to provide an improvement in the art of constructing a retaining wall.

Still a further object is to provide a block having a hollow shell which can be filled with a suitable aggregate and a bonding agent to provide a solid block with structural and mechanical strength.

Yet another object is to provide a new and improved block employing interlocking depressions and projections on adjacent blocks with centered reinforcing rods to maximize the strength of a wall or other structure.

An additional object is to provide an easily assembled prefabricated block of plastic material.

These and other objects will become more clearly apparent after a study of the following specification, when read in connection with the accompanying drawings, in which.

3 is especially suitable for use with the block of FIG. 5.

Figures 1, 7:
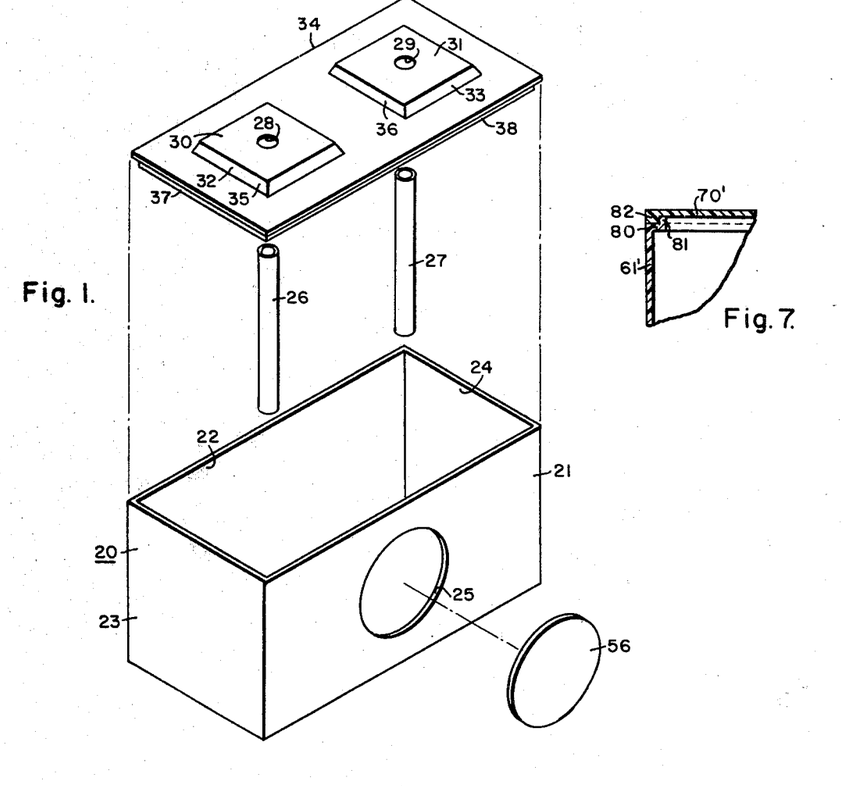
FIG. 1 is an exploded view of my block according to one method of constructing the same in five parts, in which a main body portion and a top portion are separately cast or molded, and two tube portions and a plug are separately cast, molded, or extruded, all the portions being fitted and bonded together to form a complete shell which may be thereafter loaded or charged with filler material to provide a solid block with mechanical strength.
FIG. 7 shows a modified shell wall construction employed in a shell adapted to be filled before the top thereof is attached, and the top being thereafter attached and bonded to the remainder of the shell. The block of FIG. 1 and that of FIG. 5 may be easily modified in accordance with FIG. 7.

Referring now to the drawings, in which like reference numerals are used throughout to designate like parts, for a more detailed understanding of the invention, and in particular to FIG. 1, thereof, there is shown the shell of a block generally designated 20, having side walls 21 and 22 and end walls 23 and 24, with a bottom, not shown in FIG. 1, the block being generally rectangular in shape. One side wall has an aperture 25 therein, preferably circular, through which the filler material, such as a mixture of overburden and a bonding agent, is inserted to fill the block after it is assembled, and provide mechanical strength. Cap 56 closes aperture 25 after the block is filled and is bonded in place.

In FIG. 1, the two plastic tubes are shown at 26 and 27; when the shell is assembled, the upper ends of the tubes are disposed in holes or apertures 28 and 29 in the flat surfaces 30 and 31 of tabs or projections 32 and 33 respectively in the top 34 of the shell. The extremities of the tubes are flush or coplanar with the outer surfaces of flat portions 30 and 31 of the projections.

The tabs or projections have beveled side walls sloping at a desired angle. If desired the projections may have shapes substantially resembling the frustum of a truncated quadrilateral pyramid. The side walls 35 of tab 32 are seen to taper, and the side walls 36 of tab 33 are seen to taper; the angle chosen may be varied at manufacture in accordance with the size and weight of the block, and the use to which it is to be put. Also the height of the projections above the top surface of the block, and the depth of the depressions may be chosen or varied as desired. Tabs and depressions have similar dimensions so that the tabs of one block will interfit with the depressions of an adjacent block.

On the underneath surface of the top 34 there are seen low flanges or tongues 37 and 38 which closely abut against the inner surfaces of walls 23 and 21. It will be understood that there is a tongue adjacent each edge of the under surface of the top 34, the tongues which cooperate with walls 22 and 24 not being shown in FIG. 1 for convenience of illustration.

Figure 2:
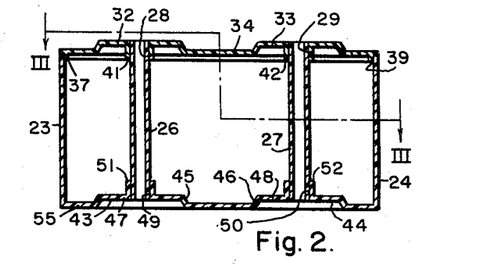
FIG. 2 is a sectional view in a vertical plane through a block assembled according to the teachings of FIG. 1.

Particular referecne is made now to FIG. 2, a section through a block constructed and assembled according to FIG. 1. Tabs or projections 32 and 33 are seen to have short tubular bosses or sleeves 41 and 42 respectively extending from the flat surfaces 30 and 31 thereof down around the apertures 28 and 29, into which bosses extend and fit the upper ends of tubes 26 and 27, the ends of the tubes being flush with the outer flat surfaces 30 and 31 of the tabs when the shell is completely assembled.

In the bottom 55 of the shell there are seen two depressions or recesses 43 and 44, these being generally square with tapering side walls 45 and 46 respectively, flat inner surfaces 47 and 48 respectively, with holes 49 and 50 centrally disposed therein respectively, each of the flat inner surfaces 47 and 48 having an inwardly extending or upwardly extending tubular boss or sleeve 51 and 52, into which the lower ends of tubes 26 and 27 extend and snugly fit, the lower extermities of the tubes being flush with the outer surfaces of the flat portions 43 and 44. Tubes 26 and 27 may be metal or may be composed of the same plastic which forms the remainder of the shell. The depressions or recesses 43 and 44 are also seen to be shaped generally like the frustum of a truncated quadrilateral pyramid. An additional tongue 39 for wall 24 is also shown in FIG. 2.

Figure 3:
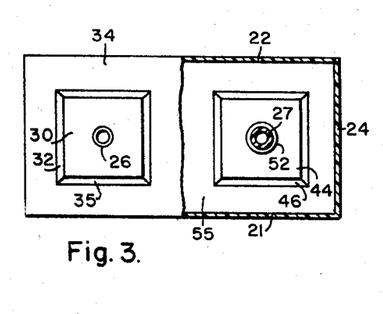
FIG. 3 is a sectional view along the lines III—III of FIG. 2.

Particular reference is made now to FIG. 3, a block shown partially in section along the lines III—III of FIG. 2. In FIG. 3, details of the block of FIGS. 1 and 2 are shown from another point of view.

In assembling the shell of block 20 from the parts shown in FIGS. 1 and 2, the lower end of tube 26 is cemented in boss 51, and the lower end of tube 27 is cemented in boss 52. Underhanging flanges or tongues 37, 38, and 39 are cemented to the edges of walls 23, 21, and 24 respectively, and it is understood that an underhanging flange or tongue on top 34 is cemented to wall 22, the last named flange or tongue not being shown for convenience of illustration. The upper end of tube 26 is cemented in boss 41; the upper end of tube 27 is cemented in boss 42.

Depressions or recesses 43 and 44 are adapted to closely and conveniently receive the corresponding tabs or projections 32 and 33 on the block immediately beneath. This feature is more clearly illustrated in FIG. 3, to which particular attention is directed. The dimensions of the lower depression 44 in bottom 55 are seen to be similar to those of the tab or projection 32 in the top 34. Or the block 20 may "overlap" two blocks in the wall under construction, the recesses 43 and 44 receiving tabs from two different blocks.

After the shell is assembled and cemented and allowed to firm, the block is charged, loaded and firmly packed with a filler material, utilizing hole 25. It will be understood that the hole or aperture 25 could be in one of the ends 23 or 24 if desired, such an arrangement being shown in FIG. 8 hereinafter to be discussed in detail. The block may be turned on its side during the filling process, and allowed to remain on its side until the filler material and bonding agent harden, whereafter plug 56 is inserted in aperture 25 and cemented in place.

As will be seen hereinafter, a structure composed of the blocks preferably has tie rods, loose rods, or short pins extending through the tubes, each rod or pin extending through at least a portion of at least two blocks. The tubes then, are a means for increasing the stability and structural strength of a structure built from a plurality of the blocks. The plastic shells, while serving a number of other purposes, are also a means for increasing the stability and structural strength of a structure built from the blocks. The surface contact area between blocks with plastic shells may be many times that of two blocks having surfaces of a mixture of a bonding agent and filler material. The increased contact surface area of two adjacent smooth plastic surfaces provides increased rigidity and compressive strength.

Figures 5, 6, 10:
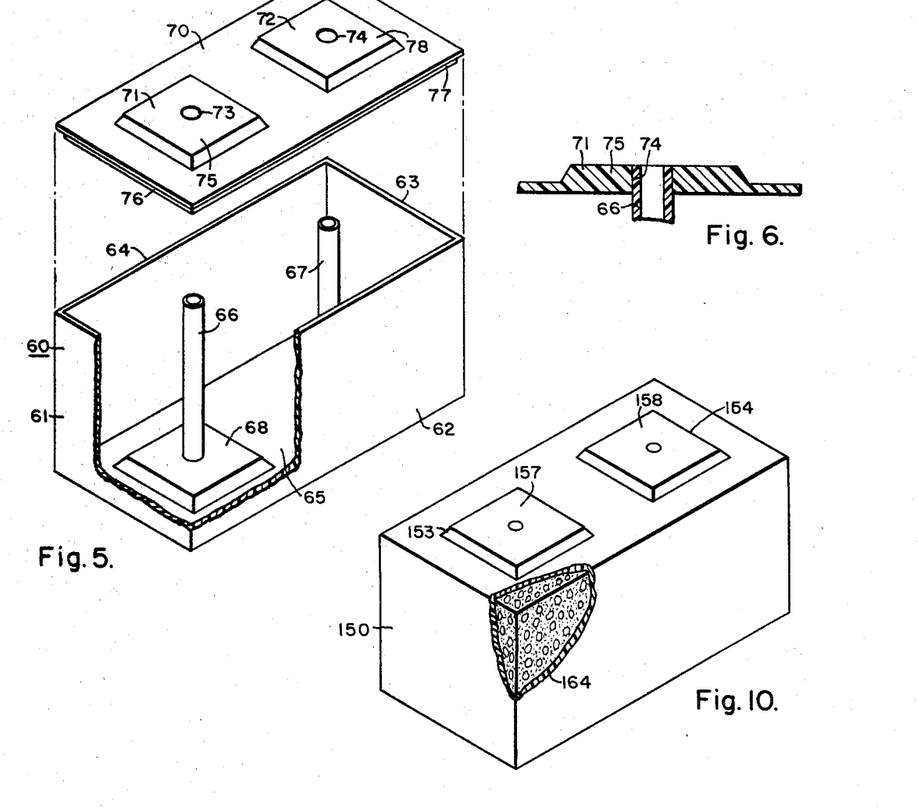
FIG. 5 is an exploded view of my block according to another method of constructing the same in two parts, in which the main body portion and the two tubes are cast or molded as one piece, and only the top is made separately and secured to the main body portion of the shell when the block is assembled.
FIG. 6 shows the construction of a projection or tab as modified to provide a block shell which can be charged or loaded with filler material before the top is affixed.
FIG. 10 is a view of a block according to still another embodiment of my invention, in which the hard solid portion with two depressions on the bottom and two projections on the top, and with two tubes extending therethrough, is first formed, and then coated with a plastic material, to form the shell of the final product.

Particular reference is made now to FIG. 5, where an exploded or expanded view partially cut away is shown of a shell molded in two parts, and assembled accroding to another method of practicing my invention. In FIG. 5, the four walls, the bottom with its two depressions or recesses, and the two tubes are cast or molded as one piece, leaving only the top to be attached to complete the shell. The embodiment of FIG. 5 is constructed and arranged to be packed with filler and bonding agent before the top is cemented to the remainder of the shell, and no hole is required corresponding to hole 25 of FIG. 1. In FIG. 5, the block generally designated 60 has sides 61, 62, 63 and 64 with a bottom 65 having two recesses therein, one being shown at 68 with tube 66, the other tube being shown at 67. Top 70 has tabs 71 and 72 with holes 73 and 74 centrally disposed therein for receiving the ends of tubes 66 and 67, the extermities of the tubes being flush with the flat external surface of the tab when the shell is assembled. Underhanging tongues fit all sides closely; tongues 76 and 77 are shown for closely fitting the sides 61 and 62 respectively. Tabs 71 and 72 are not hollow as in FIG. 1, but are solid and formed of top portions of increased thickness 75 and 78 respectively. In FIG. 6, tab 71 with portion of increased thickness 75 is shown in cross section. The tabs as before resemble in shape the frustum of a quadrilateral pyramid with tapering side walls and a flat area, centrally disposed. It is noted that in FIG. 6 the projections are solely on the shell; the body portion of the block is flat. The depressions, which are formed in both the shell and the body portion, one of these being shown at 68, are similarly shaped, the tab of one block closely and conveniently fitting in the depression of the adjacent block above. The solid tabs 71 and 72 are provided so that when the shell is packed with filler material before the top is attached, a hollow projection will not provide room for soft filler material to run into or accumulate before hardening takes place.

In FIG. 7 a modified edge construction for the block of FIG. 5 is shown, which does not require that the tongue or flange be pressed into the soft filler material when the top is attached before the filler material hardens. Top 70' has skirt 82 at the very edge thereof, extending all the way around the top, and wall 61' has inwardly extending flange portion 80 with tongue portion 81 closely fitting skirt 82. A tongue similar to 81 is provided on both side walls and both end walls.

Figures 8, 9, 18:
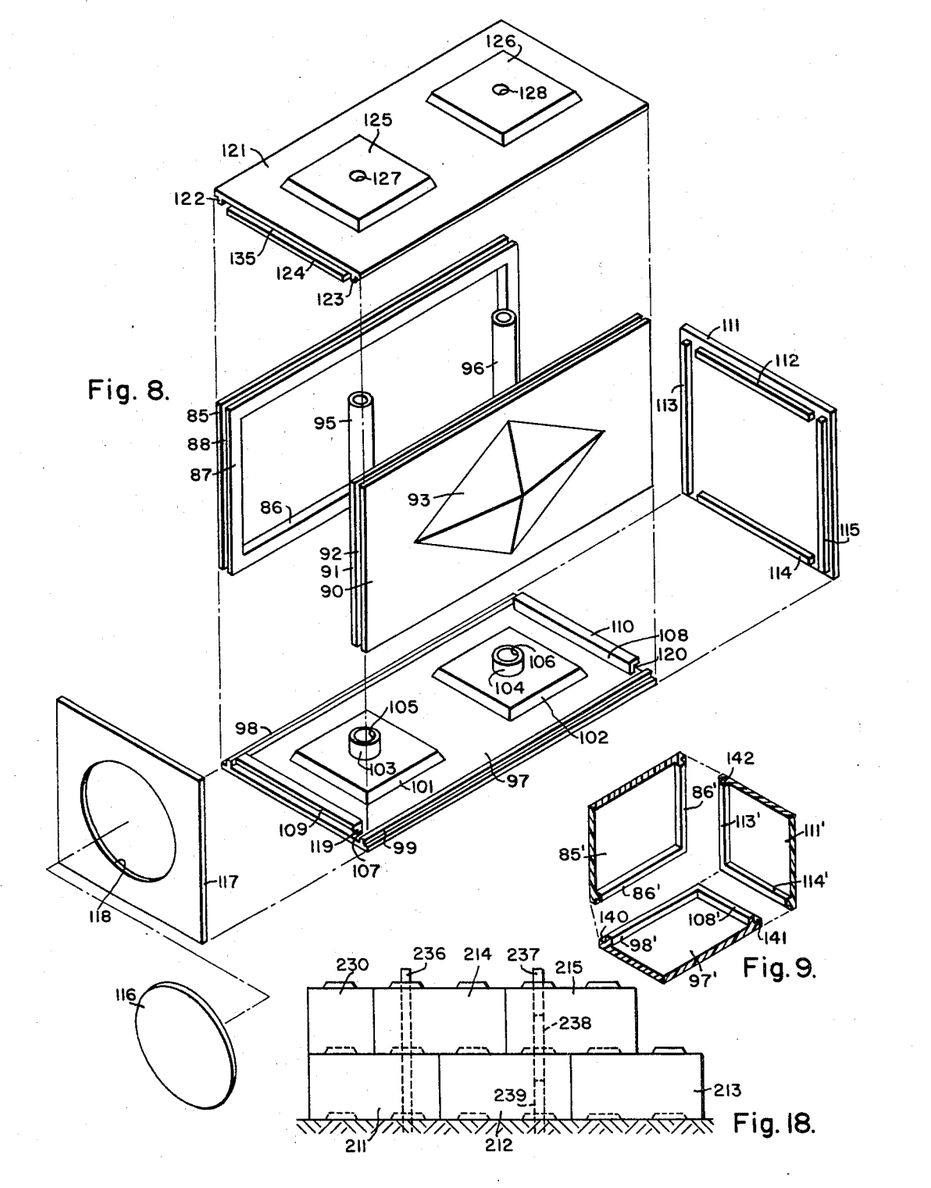
FIG. 8 is an exploded view of a block shell made in nine separate parts including a plug, in which the bottom, two sides, two ends, top, and two tubes have all been separately cast, molded, or extruded, all being attached to form the complete shell, and optionally having an ornamental design on the exterior wall of the block.
FIG. 9 is a detailed view showing modified construction for the block of FIG. 8, in which the bottom, top, ends and sides are each formed in a manner to facilitate removal from a mold.
FIG. 18 is a fragmentary view of a portion of a wall showing how a block in one row "overlaps" blocks in the rows immediately above and immediately below, also showing the use of short rods or loose pins to provide added resistance to toppling.

Particular reference is made now to FIG. 8, where another embodiment of my invention is shown in an exploded view. In FIG. 8, the ends, sides, top, bottom, two tubes and end plug are separately formed, by casting, molding, or extrusion, making a total of nine parts to be assembled. One rectangular side 85 has an inward extending flange perpendicular to the inner surface around the entire perimeter of the side, near the edge, from which tongue 87 extends to provide a groove or channel 88 around the entire border of the side, for purposes to become hereinafter more clearly apparent. Rectangular side 90 has a flange, not shown, corresponding to flange 86, and a tongue 91 providing a groove 92 around the entire border of the side. Side 90 is also seen to have an ornamental figure 93 thereon. The rear end 111, which may be substantially square, has four inwardly extending ribs 112, 113, 114, and 115, rib 115 extending into groove 92 when the shell is assembled, rib 113 extending into groove 88. Front end 117 has a filler hole 118. Plug 116 is fitted into opening 118 after the shell is charged with filler material, and cemented into place. End 117 has four ribs, not seen, extending near the edges on the inner face thereof in a manner similar to those of end 111.

The bottom 97 has longitudinally extending ribs 98 and 99 near the long edges thereof, and at the ends, extending laterally, flange portions 107 and 108 with lips 109 and 110 respectively to form grooves 119 and 120 respectively, rib 114 extending into groove 120 when the shell is assembled. Bottom 97 has two depressions or recesses 101 and 102 with tapering side walls and flat inner surface areas, with cylindrical bosses or sleeves 103 and 104 extending inwardly or upwardly therefrom having central apertures or bores 105 and 106 respectively, for receiving the respective adjacent ends of tubes 95 and 96.

Top 121 has longitudinally extending ribs 122 and 123 with a flange-supported tongue 124 forming groove 135, and two tabs or projections 125 and 126 with central bores or apertures 127 and 128.

Figure 4:
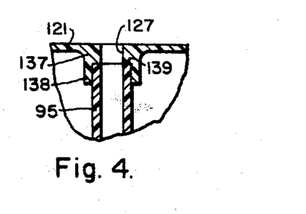
FIG. 4 is a detailed or fragmentary view of a modified tubular boss, collar or sleeve extending inwardly from the flat surface portion of a projection or depression, suitable for use in the block of FIGS. 1, 2 and 3.

Particular reference is made now to FIG. 4, where a detailed view of one arrangement for coupling or joining the tubes 95 and 96 to top 121 is shown. Top 121 is seen to have an inwardly extending cylindrical boss 137 with a portion of enlarged inner diameter 138 forming an annular shoulder 139 against which the end of tube 95 abuts. Tab 126 has a similar boss, not shown, for tube 96.

It will be understood that in FIG. 8 the tongues and ribs are cemented in their various grooves when the shell is assembled, and the ends of tubes 95 and 96 are cemented in place.

As will be readily understood by those skilled in the art, sides 85 and 90, top 121 and bottom 97, because of the flanges and lips thereon could not be molded in one piece without using a mold which was destroyed or disassembled after each molding operation. To avoid the expense entailed by such a construction process, these parts may be modified.

One such modified arrangement is shown in FIG. 9, to which particular reference is made. In FIG. 9, the tongues 87 of flange 86 of side wall 85 of FIG. 8 have been dispensed with, and the corresponding tongue 91 of the corresponding flange of side wall 90 has been dispensed with, so that side 85', FIG. 9, has a tongue 86' extending around the entire four sides near the four edges thereof, tongue 86' resting closely against surface 140 and tongue 98' of bottom 97' while the shell is assembled, tongue or rib 86' resting closely against surface 142 and tongue or rib 113' of end 111'. Tongue or rib 114' of end 111' rests closely against surface 141 and rib 108' of bottom 97' while the block shell is assembled. It will be understood that in the construction of FIG. 9, the top, not shown, has no lip or tongue corresponding to lip 124 of FIG. 8, but merely has a rib extending around the four sides near the edges thereof to fit closely against adjacent ribs on the sides and ends of the block. In such an arrangement the two sides, two ends, top and bottom can be molded and lifted or otherwise removed from the mold by motion in one direction only, and the mold need not be destroyed but may be used repeatedly.

Figures 11A, 11B:
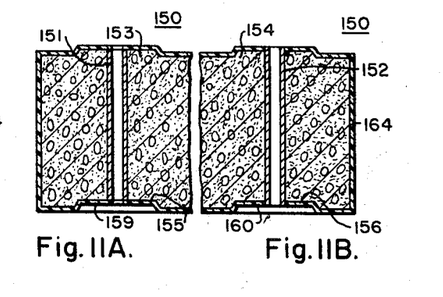
FIGS. 11A and 11B are sectional views through the block of FIG. 10, showing the tubes according to two different coating methods.

Particular reference is made now to FIG. 10, where an additional embodiment of the block of my invention is shown, the strong core or body portion 150 of the block being formed first by adding a bonding agent to overburden or other suitable filler material and allowing to harden in a mold, with two metal tubes 151 and 152, FIGS. 11A and 11B, passing through the block, the block being formed with two solid tabs or projections 153 and 154 in the top, and recesses or depressions 155 and 156, FIGS. 11A and 11B in the bottom, by using a mold which forms the projections and depressions. The dimensions of the block 150 as molded are such that when a coating of plastic material 164 is applied, the overall outside dimensions will conform to the required or desired values. Tabs 153 and 154 may be generally shaped like the frustum of a quadrilateral pyramid, with tapering side walls and a flat surface, 157 and 158 respectively, and depressions 155 and 156 are generally shaped like the frustum of a quadrilateral pyramid, with tapering side walls and flat surfaces 159 and 160 respectively.

It is seen that according to one method of forming the block of FIG. 10 and FIG. 11B, when the solid block is molded the ends of tube 152 may extend slightly beyond their respective surfaces a distance corresponding to the thickness of the coating of plastic material to be applied, this coating being shown at 164 in FIG. 10.

The block of FIGS. 10 and 11A may also be formed by passing a retaining rod through a metal tube or tubes, and dipping the block as it is held by the ends of the rod passing through the tubes. In such a case, the metal tubes will not extend beyond the surface of the solid material.

The embodiment of FIG. 10 offers some advantages, in that the solid portion may be examined for defects before the plastic coating is applied, as by dipping, spraying, or other process. Unsuitable blocks may be rejected at an early stage in the process, reducing waste.

It will be understood that after the coating of plastic material is applied, the blocks according to the embodiment of FIGS. 10, 11A and 11B have uniform dimensions, so that the plastic coated block below an adjacent block or blocks has the tabs thereof closely and conveniently fitting into the depressions of the adjacent above block or blocks.

Figure 19:
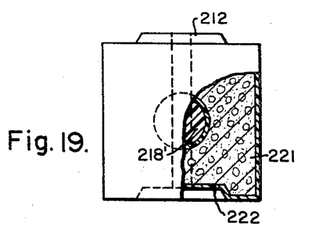
FIGS. 19 and 20 are end elevation and side elevation views of a block according to still another embodiment of my invention in which a core occupies space within the block and may reduce the weight and material cost thereof, or may provide increased mechanical strength.
Figure 20:
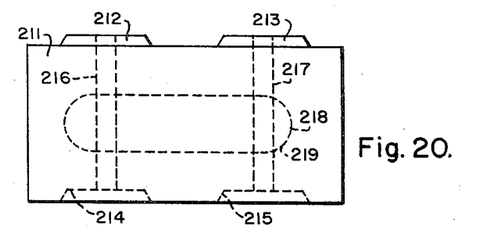

Particular reference is made now to FIGS. 19 and 20, which show in end elevation and side elevation a block according to still another embodiment of my invention. The block generally designated 211 has projections 212 and 213 on the top, and depressions 214 and 215 on the bottom. Tubes 216 and 217 pass through the block. Disposed inside the block is a space-consuming core 218. This core may be a hollow cylindrical shaped member, the wall 219 of which is composed of thin metal or plastic, the member providing and defining an air space to reduce the weight of the block.

Core 218 may be of solid material having a weight per unit volume less than that of the filler material of the block when mixed with the bonding agent, and hence the core may reduce the weight of the block. Core 218 may be of a material having greater compressive strength than the filler material, and hence give mechanical strength to the block.

Although a generally cylindrical core is shown, it will be understood that other shapes can be employed. The proportion of the total volume of the block devoted to the core may be varied at will to give the desired block weight and/or mechanical strength. If desired, tubes 216 and 217 are attached to or pass through the core, supporting it.

In FIG. 19, a partial cross section of a core 218' composed of a solid light weight plastic material is shown, with filler material 221 and shell 222 of plastic material.

Figure 21:
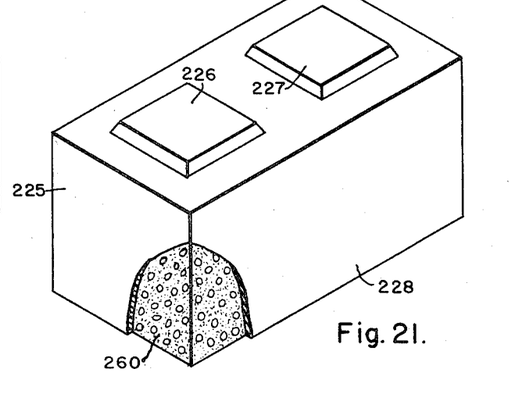
FIG. 21 is a perspective view of a block according to a further embodiment of my invention in which tubes extending through the block are not employed.

Particular reference is made now to FIG. 21, where a further embodiment of the invention is shown. In certain applications, as where the blocks will be subject to substantial compression only in a vertical direciton or plane, tubes for short pins of tie rods may be unnecessary. Block 225 has no tubes passing therethrough; it has tabs 226 and 227 with corresponding depressions, not shown, and a plastic shell 228 covering a solid body portion, which may consist of any of the previously mentioned materials. Any previously mentioned method of construction may be employed. 260 is the body portion.

If desired, block 225 may heave a core, not shown, corresponding to core 218' of FIG. 19 and 218 of FIG. 20.

Figure 22:
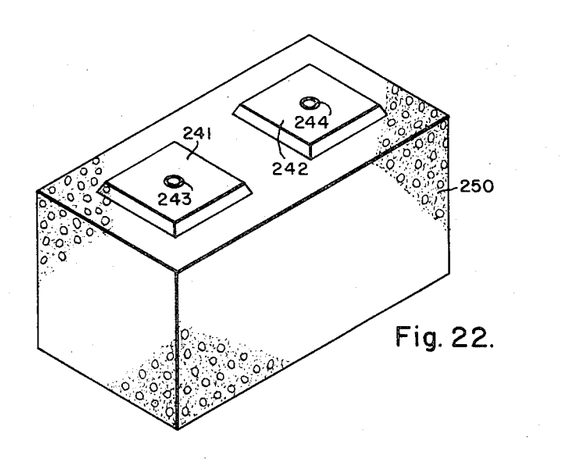
FIG. 22 is a view of my block according to another embodiment of my invention, having interfitting projections and depressions with tubes extending therethrough, but having no shell.

Particular reference is made now to FIG. 22 in which a block according to an additional embodiment of my invention is shown. The block 250 of FIG. 22 is shaped similarly to the block of FIG. 1 in that it has two projections 241 and 242 on the top surface thereof with two depressions of similar dimensions on the bottom surface thereof, with two tubes 243 and 244 extending from the projections to the depressions respectively. Block 250 has no shell, the body portion being composed of a mixture of filler material and a bonding agent and molded to dimensions within required tolerances.

If desired, block 225 may have a core, not shown, corresponding to the core 218 of FIGS. 19 and 20, for adding mechanical strength or reducing the weight of the block.

Figure 23:
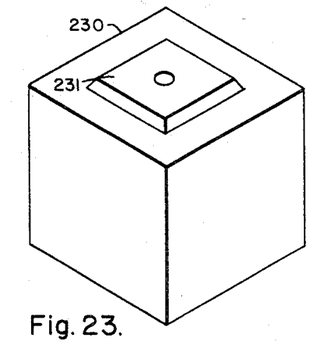
FIG. 23 is a perspective view of a "half block" having only one tab and one depression, for use at the ends of a wall.

Particular reference is made now to FIG. 23, which shows a half block, especially constructed to be used at the ends of a wall. Half block 230 has one tab 231 and one depression, not shown, of suitable dimensions to mesh with the depressions and projections of a whole block.

In FIG. 23 a tube is shown, but it is understood that a half block without a tube and similar to block 225 of FIG. 21 may be constructed.

Figures 12, 15, 17:
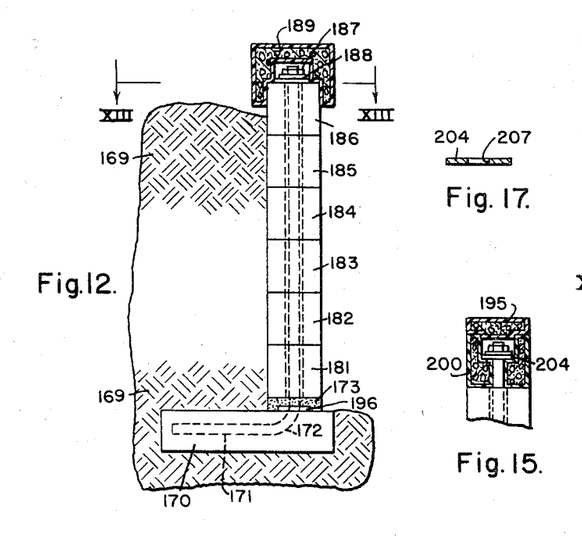
FIG. 12 is a side elevation with a detail in section of a wall constructed with my block and using my novel "book end" principle.
FIG. 15 is a detailed sectional view of the manner in which the tie rods are anchored at the upper ends thereof.
FIG. 17 is a cross-section through the strip of FIG. 16.

Particular reference is made now to FIG. 12 which shows in side elevation a wall constructed with the blocks of my invention and utilizing my "book end" principle. Footing 170 of concrete or other similar material has the end 171 of the tie rod anchored firmly therein, and is covered with earth 169 after the wall is completed. The rod has a bend at 172 and continues in a vertical direction, passing through one of the spaced holes in a specially shaped spacing plate 196 similar to plate 204, FIG. 16. The reference numeral 173 designates grout. Thence through the tubes of blocks 181, 182, 183, 184, 185 and 186, the rod extends beyond the top of block 186 and is firmly secured by nut 187 and washer 188. A special cover block 189 or strip may if desired enclose the extended ends of the tie rods.

Figure 14:
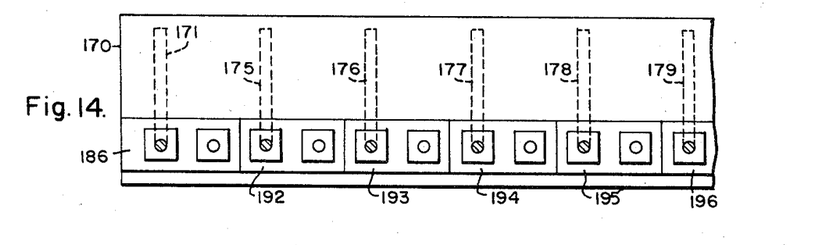
FIG. 14 is a plan view of the wall of FIG. 10 according to another method of anchoring the reinforcing rods in a footing having greater surface area.

FIG. 14 shows a plan view, with the earth removed for clarity of illustratioin, and the nuts, washers, and cover block 189 also removed for clarity of illustration. In FIG. 14, the footing 170 is seen to extend in an unbroken fashion the entire length of the wall, having tie rods at spaced intervals, including tie rod 171 passing through block 186, and having additional tie rods 175, 176, 177, 178 and 179 passing through blocks 192, 193, 194, 195 and 196 respectively. It is observed that with tie rods staggered through every other tube along the length of the wall, that every block in the wall will have one tie rod passing therethrough.

Figure 13:
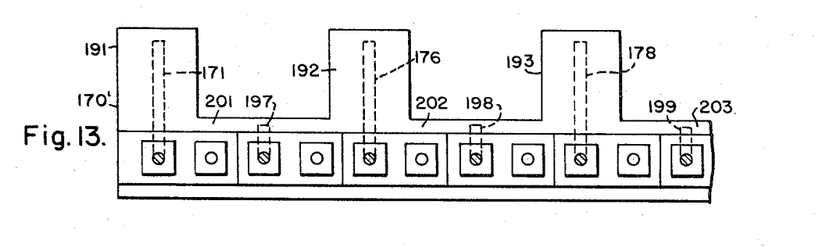
FIG. 13 is a sectional view in a horizontal plane through the wall of FIG. 12.

In some cases it may not be necessary to have the footing extend the full distance to the rear along the entire length of the wall. FIG. 13, to which particular reference is made, shows such an arrangement, where the footing 170' has three elongated portions 191, 192 and 193 with tie rods 171, 176 and 178 therein respectively, the tie rods 197, 198 and 199 having short anchored ends which do not extend beyond the surface of narrow portions 201, 202 and 203 of the footing 170'. The construction of FIG. 13 is suitable for low walls, or where the pressure of earth to be retained is not too great.

In FIG. 18, to which particular reference is made, two methods of providing increased shear strength, or two block interlocking devices, which may be substituted for the anchored rods of FIG. 12, are shown. In the construction of FIG. 12, it is necessary to "slide" blocks down the respective rods after anchoring. FIG. 18 symbolizes a constructed wall, and shows the depressions of an upper row of full length blocks 214 and 215 and a half block 230 at the end receiving the projections of a lower row of blocks 211, 212 and 213.

According to one additional method of constructing a wall, after all the blocks are laid, loose pins, such as pin 236 of FIG. 18, are inserted in as many groups of aligned tubes of the blocks as are deemed desirable to give the needed additional strength.

As an alternate method of construction, as the wall is built short pins 237, 238 and 239 are inserted in the tubes, the lower ends of the short pins resting about midpoint of the lower blocks, the upper ends of the short pins approximately coinciding with the middle of the upper row of blocks. By this method additional shear strength may be provided, while utilizing an easier method of pin insertion In FIG. 16 there is shown a plate 204, which may cover the top of the wall, the plate being of steel or other suitable metal, with spaced holes 205, 206, 207, 208 and 209 therein of a diameter to permit free passage of the tie rods, the holes being spaced from each other a distance corresponding to the distance between axes of the tubes in the blocks.

It is noted from FIGURES 13 and 14 that the distance between adjacent tube axes of adjacent blocks is substantially the same as the distance between the two tube axes of the same block. This insures that when the blocks are laid end to end to form a wall, that the distances between tie rods will be the same irrespective of whether or not the distance is measured between the tube axes of one block, or the tube axes of adjacent tubes of adjacent blocks.

Figure 16:
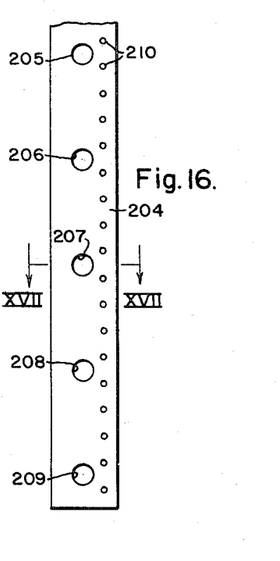
FIG. 16 is a plan view of a spacing strip.

Plate 204 is seen to have a row of small aligned spaced holes 210 therein, referred to as "convenience" holes, to facilitate nailing.

In FIG. 15, the tie rod is seen to terminate in specially shaped capping block 200, the tie rod being anchored by the nut and washer shown, block 200 having elongated cap or cover 195.

FIG. 17 shows the plate in cross section along the lines XVII—XVII of FIG. 16.

There have been provided then several embodiments of a block according to my invention and several methods of assembling the same from multipiece castings, moldings or extrusions, as well as one-piece construction, and an embodiment in which the solid portion of the block is molded first and thereafter coated with a plastic material, for example, by dipping. I have also shown a block according to my invention having interfitting projections and depressions, with tubes passing therethrough, but having no exterior shell, and I have shown an embodiment having interfitting projections and depressions, having a shell but having no tubes.

All embodiments of my block are well suited to accomplish the objectives of my invention.

In further summary, my invention offers advantages including the following:

(1) The outer surface of the block in some embodiments is made from a tough moldable plastic material, which is held to dimensions accurate enough to allow the interlocking of successive rows of blocks.

(2) The block is essentially of a rectangular shape, with two tabs or projections protruding above the surface at the top of the block. The bottom of the block has two recesses or depressions in its surface. Through the center of the tabs and recesses there is a tube normal to the tab and recess faces, the tube extending through the block. The tabs and recesses facilitate the interlocking of successive layers of blocks.

(3) The outer cover of plastic material acts as the form, mold or shell for filler material in some embodiments.

(4) In some embodiments a hole in the end or side of the block is used to fill the block with a mixture of overburden or other suitable filler material and a bonding agent to form a solid, strong block.

(5) Many textures are possible on exposed faces.

(6) A large selection of colors is possible.

(7) The finish is permanent.

(8) The finish is weatherproof.

(9) A new art of constructing a wall is employed, using my "book end" principle.

(10) A wall can be erected of the blocks without the use of a bonding agent between blocks.

(11) The tubes through the centers of the tabs and depressions are for the installation of metal reinforcing rods. The insertion of the metal rods helps increase the strength of tall retaining walls and adds to stability.

(12) When used outside in retaining wall construction, a small space designed into the spacing of the vertical joints can allow moisture to seep out from the earth being retained. This reduces the possibility of the wall being pushed over as a result of water freezing behind the blocks.

(13) When used inside as a room divider or partition wall, because the surfaces are pre-finished and suitably textured, no further finishing is necessary.

(14) A layman can do a construction job at a reduction in cost by elimination of the labor and material required to cement ordinary construction blocks made of clay, stone, or cement mixture.

(15) Special block shapes can fit into a variety of situations.

(16) Special accessory items, such as plate 204, FIG. 16, can make the construction of this type wall easier.

In a manual entitled "Concrete and Masonry," Dept. of the Army Technical Manual TM 5–742, October 1964, pages 118–127 inclusive, there is an excellent and profusely illustrated description of the construction procedures employed in using conventional building blocks. To summarize but a few of the steps which the features of my block render unnecessary, with my spacer plate 196 and tie rods 171, it is not necessary to string out blocks for preliminary joint spacing. A person using my block does not have to butter the ends, check the horizontal spacing, etc. The figures of the manual are largely self-explanatory and it will be apparent that many of the steps so well depicted may be avoided as a result of the omission of a bonding agent between blocks, the use of blocks having interfitting projections and depressions, and the use of rods in the tubes, whether long or short.

In calculating the forces active in the wall of FIGURES 12, 13 and 14, the force in pounds developed to retain the wall from toppling may be approximated by the following formula:

$$F=VW$$

where:

F=Force in pounds
V=Volume of earth (in cubic feet) above the footing (width×length×height)
W=Weight of earth per foot$^3$ (average 40 lbs. per cubic foot)

Suitable plastics for molding or casting the parts of the shell, tubes and plugs when the shell is made in several parts are:

*Thermoplastic*

(1) Polycarbonates (10–40% glass reinforced if desired)
(2) Arcylic, such as methyl methacrylate
(3) Polychlorotrifluoroethylene

*Thermosetting*

(1) Diallyl phthalate, glass filled
(2) Polyester and alkyd molding compounds: (a) Synthetic fiber filled; (b) asbestos filled; and (c) granular and putty types, mineral filled.

For a fuller understanding of the dip coating, molding and casting of plastics, reference may be had to "Modern Plastics," 1964 encyclopedia issue, published by Plastics Catalogue Corporation, Emmett St., Bristol, Conn.

Reference may also be made to "Product Engineering," Aug. 3, 1964, pp. 84–91 inc.

Suitable plastics for extruding the tubes may also be employed.

Suitable plastics for coating the block of FIG. 10, FIGS. 11A and 11B by dipping or other process are: vinyl, epoxy, nylon, and Teflon.

Physical and chemical properties of some of the plastic materials listed in this patent application may be found in the following published material: Plastics Properties Charts, "Part I Thermoplastics" and "Part II Thermosets," as appeared in "Modern Plastics Encyclopedia" issued 1963.

The parameters used for selection of materials included the following: Effect of sunlight, molding qualities, mold shrinkage, tensile strength, elongation percent, flexural strength, and effect of organic solvents.

Plastics used for the coating of blocks included those chosen from the article "Fluidized-bed Process," as published in "Product Engineering" magazine, Aug. 3, 1964, pp. 84–91 inc.

Suitable combinations of filler material and bonding agent are

| Material: | Bonding agent |
|---|---|
| Sand | Portland cement, water. |
| Sand and gravel | Do. |
| Coal mine waste | Do. |

Where coal mine waste is employed, it may be screened through a mesh of suitable dimensions to eliminate material larger than ¼ inch and smaller than ¹⁄₁₆ inch, although the invention is not limited to material particles of these sizes.

Where coal mine waste is employed, the proportion by weight ranges from 1 to 2 parts waste to 1 part of bonding agent.

The half blocks of FIG. 23 can be manufactured by methods similar to those described heretofore.

The arrangement of FIG. 4 may also be used in the embodiments of FIGS. 1 and 5.

Whereas the invention has been shown and described with respect to blocks having two projections and two depressions, it should be understood that the invention is not limited thereto. Any number of projections greater than one will permit overlapping of a block in one row with blocks in the rows immediately above and immediately below. Three or four projections with an equal number of depressions can be employed.

The term "surface irregularity" when used in the claims appended hereto is generic to both the projections and depressions, tabs or recesses, whatever called. The adjective "complementary" when applied to a projection or depression without a modifier means complementary to the irregularity immediately opposite thereto on the other surface of the block, whether such irregularity be a depression or projection.

The terms "plastic" and "plastic material" as employed herein include substances capable of producing a smooth surface and filling the pores of the body material.

I claim as my invention:

1. A block suitable for building a structure wherein vertically aligned adjacent rows of blocks are employed, comprising a shell of plastic material generally rectangular in shape and generally rectangular in cross section and including means forming ends, side walls, a bottom and a top, the means forming one rectangular surface of the top and bottom including means forming a plurality of spaced projections thereon, the means forming the opposite rectangular surface of the top and bottom including means forming an equal number of complementary spaced depressions therein, the projections of one block being adapted to fit conveniently in the depressions of a vertically adjacent block, the depressions of said one block being adapted to conveniently receive the projections of another vertically adjacent block, a plurality of tubes passing through said one block, each tube extending from a depression on one surface to the complementary projection on the opposite surface, the means forming the projections and the means forming the depressions having means for precisely positioning the adjacent ends of the tubes, the projections and depressions having circular openings therein the centers of which are axially aligned with the axes of the tubes, the tubes being of substantially uniform inside diameter throughout their lengths and being adapted to have rods pass therethrough, and a core of solid material in the shell substantially filling all the space therein not occupied by the tubes.

2. A block according to claim 1 wherein the means for precisely positioning the tubes includes generally cylindrical collars extending toward the interior of the shell and formed integrally with the means forming the top and the means forming the bottom, said collars having an inside diameter over at least a portion of their lengths whereby the adjacent ends of the tubes snugly fit into the collars.

3. A block according to claim 1 wherein the solid material of the core is additionally characterized as containing a mixture of coal mine waste and a bonding agent.

4. A block suitable for building a structure wherein vertically aligned adjacent rows of blocks are employed, comprising a shell of plastic material generally rectangular in shape and generally rectangular in cross section and including means forming ends, side walls, a bottom and a top, the means forming one rectangular surface of the top and bottom including means forming a plurality of spaced projections thereon, the means forming the opposite rectangular surface of the top and bottom including means forming an equal number of complementary spaced depressions therein, the projections of one block being adapted to fit conveniently in the depressions of a vertically adjacent block, the depressions of said one block being adapted to conveniently receive the projections of another vertically adjacent block, a plurality of tubes passing through said one block, each tube extending from a depression on one surface to the complementary projection on the opposite surface, the means forming the projections and the means forming the depressions including means for precisely positioning the adjacent ends of the tubes, the projections and depressions having circular openings therein having centers axially aligned with the tubes, the tubes being of substantially uniform inside diameter throughout their lengths and being adapted to have rods pass therethrough, rigid means inside the shell defining a space, and a core comprising filler material and a bonding agent substantially filling all the space inside the shell not occupied by the tubes and the space defined by the rigid means.

5. A block according to claim 4 in which the rigid means inside the shell defines an air space.

6. A block according to claim 4 in which the space inside the rigid means inside the shell is filled with a material substantially smaller in weight per unit volume than the weight per unit volume of the filler material and the bonding agent.

7. A block suitable for building a structure wherein vertically aligned adjacent rows of blocks are employed, comprising a shell of plastic material generally rectangular in shape and generally rectangular in cross section, the shell being formed in two pieces, one of said pieces including a bottom, ends, and side walls, at least two spaced tubes extending vertically from the bottom and formed integrally therewith, said bottom being formed with at least two depressions therein having openings therein in alignment with the tubes, the other of said pieces being the top, said top being shaped to have at least two spaced projections thereon, the depressions and projections being complementary to each other, said tubes extending through the block to the projections, the projections on the other of said pieces having openings therein aligned with the tubes and precisely positioning the adjacent ends of the tubes, the tubes being of substantially uniform inside diameter throughout their lengths and being adapted to have rods pass therethrough, the projections of one block being adapted to fit conveniently in the depressions of a vertically adjacent block, the depressions in said one block being adapted to conveniently receive the projections of another vertically adjacent block, and a core of solid material in the shell substantially filling all the space therein not occupied by the tubes.

8. A block according to claim 7 in which said one piece has an inwardly extending flange extending substantially the full lengths of the sides and ends at the edges thereof adjacent the other piece which forms the top, an upwardly extending lip extending from the flange over substantially the entire length thereof, and the other piece forming the top has a downwardly extending flange substantially all the way around the edges thereof, said downwardly extending flange fitting closely the outside surface of said lip.

9. A block suitable for building a structure wherein vertically aligned adjacent rows of blocks are employed, comprising a shell of plastic material generally rectangular in shape and generally rectangular in cross section, the shell being formed in two pieces, one of said pieces including a bottom, ends, and side walls, at least two spaced tubes extending vertically from the bottom and formed integrally therewith, said bottom being formed with at least two depressions therein having openings therein in alignment with the tubes, the other of said pieces being the top, said top being shaped to have at least two spaced projections thereon, the depressions and projections being complementary to each other, the projections of one block being adapted to fit conveniently in the depressions of a vertically adjacent block, the depressions in said one block being adapted to conveniently receive the projections of another vertically adjacent block, said tubes extending through the block to the projections, the projections on the other of said pieces having openings therein aligned with the tubes and precisely positioning the adjacent ends of the tubes, the tubes being of substantially uniform inside diameter throughout their lengths and being adapted to have rods pass therethrough, rigid means inside the shell defining a space, and a core of solid material including a filler material and a bonding agent substantially filling all the space in the shell not occupied by the tubes and the space defined by the rigid means.

10. A block according to claim 9 in which the rigid means inside the shell defines an air space.

11. A block according to claim 9 in which the space inside the rigid means inside the shell is filled with a material substantially smaller in weight per unit volume than the weight per unit volume of the filler material and the bonding agent.

12. A block suitable for building a structure wherein vertically aligned adjacent rows of blocks are employed, comprising a shell of plastic material generally rectangular in shape and generally rectangular in cross section, the shell being formed in two pieces, one of said pieces including a bottom, ends, and side walls, the other of said pieces being the top, the bottom being formed with at least two spaced depressions therein each having a cylindrical boss extending therefrom toward the interior of the shell and each having an opening therein the center of which is in alignment with the axis of the boss, the top being formed with at least two spaced projections thereon having shapes and dimensions similar to those of the depressions, each of the projections having a cylindrical boss extending therefrom toward the interior of the shell and each having an opening therein the center of which is in alignment with the axis of the boss, at least two tubes extending vertically through the block with the upper ends thereof closely fitting the bosses on the projections and the lower ends thereof closely fitting the bosses on the depressions, the projections of one block being adapted to fit conveniently in the depressions of a vertically adjacent block, the depressions in said one block being adapted to conveniently receive the projections of another vertically adjacent block, the tubes being of substantially uniform inside diameter throughout their lengths and being adapted to have rods pass therethrough, and a core of solid material composed of filler material and a bonding agent in the shell substantially filling all the space therein not occupied by the tubes and bosses.

13. A block suitable for building a structure wherein vertically aligned adjacent rows of blocks are employed, comprising a shell of plastic material generally rectangular in shape and generally rectangular in cross section, the shell being formed in two pieces, one of said pieces including a bottom, ends, and side walls, the other of said pieces being the top, the bottom being formed with at least two spaced depressions therein each having a cylindrical boss extending therefrom toward the interior of the shell and each having an opening therein the center of which is in alignment with the axis of the boss, the top being formed with at least two spaced projections thereon having shapes and dimensions similar to those of the depressions, each of the projections having a cylindrical boss extending therefrom toward the interior of the shell and each having an opening therein the center of which is in alignment with the axis of the boss, at least two tubes extending vertically through the block with the upper ends thereof closely fitting the bosses on the projections and the lower ends thereof closely fitting the bosses on the depressions, the projections of one block being adapted to fit conveniently in the depressions of a vertically adjacent block, the depressions in said one block being adapted to conveniently receive the projections of another vertically adjacent block, the tubes being of substantially uniform inside diameter throughout their lengths and being adapted to have rods pass therethrough, rigid means inside the shell defining a space, and a core of solid material including filler material and a bonding agent substantially filling all the space in the shell not occupied by the tubes, the bosses, and the space defined by the rigid means.

14. A block according to claim 13 in which the rigid means inside the shell defines an air space.

15. A block according to claim 13 in which the space inside the rigid means inside the shell is filled with a material substantially smaller in weight per unit volume than the weight per unit volume of the filler material and the bonding agent.

16. A block suitable for building a structure wherein vertically aligned adjacent rows of blocks are employed, comprising a shell of plastic material generally rectangular in shape and generally rectangular in cross section, the shell having separately formed sides, separately formed ends, a separately formed top and a separately formed bottom, the sides having grooves extending around all of the edges thereof, both the ends having inwardly extending flanges along the edges thereof which fit into adjacent grooves in the sides, the bottom having flanges along the two longer edges thereof which fit into the adjacent grooves of the sides, the bottom having grooves along the two shorter edges thereof into which fit the adjacent flanges of the ends, the top having flanges extending from the longer edges thereof which fit into the adjacent grooves in the sides, the top having grooves along the shorter edges thereof into which fit the adjacent flanges of the ends, the bottom being formed with at least two spaced depressions therein each having a cylindrical boss extending therefrom toward the interior of the shell and each having an opening therein the center of which is in alignment with the axis of the boss, the top being formed with at least two spaced projections thereon having shapes and dimensions similar to those of the depressions, each of the projections having a cylindrical boss extending therefrom toward the interior of the shell and each having an opening therein the center of which is in alignment with the axis of the boss, at least two tubes extending vertically through the block with the upper ends thereof closely fitting the bosses on the projections and the lower ends thereof closely fitting the bosses on the depressions, the projections of one block being adapted to fit conveniently in the depressions of a vertically adjacent block, the depressions in said one block being adapted to conveniently receive the projections of another vertically adjacent block, the tubes being adapted to have rods pass therethrough, and a core of solid material composed of filler material and a bonding agent in the shell substantially filling all the space therein not occupied by the tubes and bosses.

References Cited

UNITED STATES PATENTS

| | | | |
|---|---|---|---|
| 422,901 | 3/1890 | Arnett | 52—599 |
| 1,250,971 | 12/1917 | Converse | 52—594 X |
| 1,640,065 | 8/1927 | Blaw | 52—303 X |
| 1,900,833 | 3/1933 | Maul et al. | 52—515 X |
| 1,950,397 | 3/1934 | Cahill | 52—303 X |
| 1,567,301 | 12/1925 | Ross | 52—585 X |
| 2,565,823 | 8/1951 | Pool | 46—25 |
| 3,180,060 | 4/1965 | Persak | 52—591 |

FOREIGN PATENTS

| | | |
|---|---|---|
| 530,129 | 9/1956 | Canada. |
| 878,329 | 10/1942 | France. |
| 2,907 | 2/1884 | Great Britain. |
| 436,287 | 9/1935 | Great Britain. |
| 903,072 | 8/1962 | Great Britain. |

ALFRED C. PERHAM, *Primary Examiner.*

U.S. Cl. X.R.

52—309, 576, 594, 612